(12) United States Patent
Hagiwara et al.

(10) Patent No.: US 7,779,180 B2
(45) Date of Patent: Aug. 17, 2010

(54) SEMICONDUCTOR DEVICE AND SYSTEM FOR PERFORMING DATA PROCESSING

(75) Inventors: Masayuki Hagiwara, Yokohama (JP); Hirotomo Kobayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 542 days.

(21) Appl. No.: 11/411,175

(22) Filed: Apr. 26, 2006

(65) Prior Publication Data
US 2006/0268327 A1 Nov. 30, 2006

(30) Foreign Application Priority Data
Apr. 26, 2005 (JP) .......................... P2005-128369

(51) Int. Cl.
*G06F 13/12* (2006.01)
*G06F 13/38* (2006.01)

(52) U.S. Cl. .................... 710/62; 710/5; 709/220; 709/238; 712/20; 712/29

(58) Field of Classification Search ............... None
See application file for complete search history.

(56) References Cited

U.S. PATENT DOCUMENTS 5,930,808 A * 7/1999 Yamanaka et al. .......... 715/205
6,918,058 B2 * 7/2005 Miura et al. .................. 714/30
2005/0268038 A1 * 12/2005 Yasue ......................... 711/118
2006/0136570 A1 * 6/2006 Pandya ........................ 709/217

FOREIGN PATENT DOCUMENTS

JP 2003-108370 4/2003

* cited by examiner

*Primary Examiner*—Tariq Hafiz
*Assistant Examiner*—Aurangzeb Hassan
(74) *Attorney, Agent, or Firm*—Oblon, Spivak, McClelland, Maier & Neustadt, L.L.P.

(57) ABSTRACT

A data processing module includes: a data converter having a TranslateData interface for receiving input data and sending output data, a Property interface for sending and receiving parameter data composed of a character string parameter for Property control, and Open/Close interface for initializing the environment and the state, a query interface for obtaining entries of the internal interfaces of the Open/Close interface, the TranslateData interface, and the Property interface, an API interface for dynamically obtaining by the query interface the four kinds of interfaces of the Open, Close, Property, and TranslateData, and a callback interface designated by the Property interface.

19 Claims, 10 Drawing Sheets

FIG. 6

| DATA COMMAND | MEANING | EXPLANATION |
|---|---|---|
| C | ALL OBTAINABLE PARAMETERS | INDEPENDENT COMMAND; FOR OBTAINING ALL OBTAINABLE PARAMETERS |
| C0 | MODULE ID | "AAC_DECODER" |
| C1 | MODULE TYPE | "AUDIO" |
| C2 | VERSION | MODULE VERSION |
| C3 | HANDLE SIZE | SIZE SIZE OF HANDLE USED IN MODULE |
| C8 | POINTER TO APPLICATION SPECIFIC ENVIRONMENT | APPLICATION SPECIFIC INFORMATION; NULL IS SET AS DEFAULT |
| C30 | INPUT DATA TYPE | FOR INDICATING INPUT DATA TYPE IN COMMAND FORM; D107 (AAC-LC) |
| C40 | OUTPUT DATA TYPE | FOR INDICATING OUTPUT DATA TYPE IN COMMAND FORM; D101 (16bit LINEAR PCM LITTLE) |
| C100 | SAMPLING FREQUENCY | FOR OBTAINING AND SETTING SAMPLING FREQUENCY; DEFAULT: 44100Hz |
| C101 | NUMBER OF CHANNELS | FOR OBTAINING AND SETTING NUMBER OF CHANNELS; DEFAULT: 2CH |
| C102 | NUMBER OF SAMPLE FRAMES | NUMBER OF FRAMES PER SAMPLE; 1024 (FIXED VALUE) |
| C300 | SAMPLE SIZE USED IN DECODING | FOR OBTAINING NUMBER OF BYTES OF FRAMES USED IN DECODING; THE VALUE IS SENT BACK TO INPUT SIZE LIST OF TranslateData; IT IS SET AFTER TranslateData() IS CALLED. |
| C403 | AAC MODE | 1=MAIN, 2=LC, 3=SSR, 4=LTP; DEFAULT: 2=LC |

FIG. 7

```c
typedef struct
{
    int (*Open)(void **handle,void *env_area,int env_size);
    int (*Close)(void *handle);
    int (*Property)(void *handle,char *data_command,char *return_value,void
**pointer_value);
    int (*TransrateData)(void *handle,char **input_buffer,int *input_buffer_size_list,
        int number_of_input_data,char **output_buffer,int *output_buffer_size_list,
        int *number_of_output_data);
} AACDEC_API_INTERFACE;

extern void *aacdec_QueryInterface(char *plugin_api_interface_name);

int AAC_Decode(char *infilename)
{
    FILE    *rfp, *wfp;
    char    str[128], read_buffer[4096], output_buffer[8192], *ptr, *ptr2;
    int     handle_size, in_buffer_size, out_data_size, i;
    void    *handle,*env_area;
    AACDEC_API_INTERFACE    aac_interface;

if((rfp = fopen(infilename,"rb")) == NULL)
        return(-1);
    if((wfp = fopen(argv[2],"wb")) == NULL)
    {
        fclose(rfp);
        return(-2);
    }

/* Get interface */
    aac_interface.Open = aacdec_QueryInterface("Open");
    aac_interface.Close = aacdec_QueryInterface("Close");
    aac_interface.Property = aacdec_QueryInterface("Property");
    aac_interface.TransrateData = aacdec_QueryInterface("TransrateData");

/* Get handle size */
    aac_interface.Property(NULL,"C3",str,NULL,NULL);
    handle_size = atoi(&str[3]);
    printf("Handle Size = %u\n",handle_size);
    if((env_area = malloc(handle_size)) == NULL)
        return(-3);
    aac_interface.Property(NULL,"C0",str,NULL);
    printf("Module ID = %s",&str[3]);
    aac_interface.Property(NULL,"C1",str,NULL);
    printf("Module Type = %s",&str[3]);

aac_interface.Open(&handle,env_area,handle_size);

aac_interface.Property(handle,"C100=44100\nC101=2",NULL,NULL);  /* 44.1KHz,2ch */
    fread(read_buffer,1,sizeof(read_buffer),rfp);
    ptr = read_buffer;          /* Set input buffer pointer */
    ptr2 = output_buffer;       /* Set output buffer pointer */
    for(i = 0;;i++)    /* Decode main loop */
    {
        in_buffer_size = sizeof(read_buffer);

if(aac_interface.TransrateData(handle,&ptr,&in_buffer_size,1,&ptr2,&out_data_size,NULL)
!= 0)
            printf("*** Decode Error.\n");
        fwrite(output_buffer,1,out_data_size,wfp);
        /* Input Buffer Shift */
        memcpy(read_buffer,&read_buffer[in_buffer_size],sizeof(read_buffer) -
in_buffer_size);
        if(fread(&read_buffer[sizeof(read_buffer) - in_buffer_size],1,in_buffer_size,rfp)
<= 0)
            break;
    }
    aac_interface.Close(handle);
    free(handle);
    fclose(rfp);
    fclose(wfp);
    return(0);
}
```

SEMICONDUCTOR DEVICE AND SYSTEM FOR PERFORMING DATA PROCESSING

RELATED APPLICATION(S)

The present disclosure relates to the subject matter contained in Japanese Patent Application No. 2005-128369 filed on Apr. 26, 2005, which is incorporated herein by reference in its entirety.

FIELD

The present invention relates to a semiconductor device and a system for performing data processing, and in particular to a data processing module allowing to modularize a wide variety of modules such as a codec module as a data converter simply provided with input and output.

BACKGROUND

Conventionally, when a large variety of modules are created, each having a different parameter and a function, the interface dedicated to each of the modules must be formed in accordance therewith. Further, since the modules are different in the number of parameters and functions depending on the kind of each of modules, a large number of interfaces might be required to be prepared. Although it is possible to deal with a relatively small number of modules, with several tens of kinds of modules, the interfaces for respective modules are intricately intertwined with each other causing the implementation to be more difficult. Even in a case in which information of each of the parameters for each of the modules is passed by use of a table, all modules relating to each of the table structures need to be recompiled every time the table structure changes. Further, when recombination of the modules is required, the wide variety of interfaces prevents the recombination from being performed with ease. Therefore, a superordinate application program and the modules must eventually be reformed. The problems described above are inevitable unless the interfaces of the wide variety of kinds of modules are unified into a single kind.

A document JP-A-7-200798 discloses a method for providing software control for an imaging device and a plurality of image processing units capable of providing flexibility for manufacturing or realizing a wide variety of imaging devices to sufficiently reduce time and cost of development.

A document JP-A-2005-038251 discloses a distributed control system and a software design support system for the distributed control system for enhancing reusability of a control software module.

SUMMARY

The present invention is directed to a data processing module allowing to modularize a wide variety of modules such as a codec as a data converter simply provided with input and output, easily modified or extended in the function while minimizing influence to the surrounding environment, easily connected or recombined in code level, and unified and simplified in the connection procedure.

According to a first aspect of the invention, there is provided a semiconductor device including: a plurality of data processing modules; a controller that controls the data processing modules; a memory module that provides a work area for the data processing modules and the controller; and a bus that allows the controller to access to the data processing modules and the memory module. Each of the data processing modules includes: a core module that performs data processing on input data and generates output data; a first interface that receives the input data and outputs the output data; a second interface that receives parameter data to be used in the data processing performed by the core module, and outputs information regarding the core module; a third interface that initializes an environment and a state for the data processing performed by the core module, and releases the environment; and a query interface that notifies static entries of the first interface, the second interface, and the third interface, to the controller for enabling the controller to access the first interface, the second interface, and the third interface, in a common procedure with respect to other ones of the data processing modules.

According to a second aspect of the invention, there is provided a system for performing data processing, including: a plurality of data processing modules; a software framework that communicates with the data processing modules; and a processing unit that performs procedures in accordance with the software framework and the data processing modules. Each of the data processing modules includes: a core module for performing the data processing on input data and generating output data; a first interface for receiving the input data and outputting the output data; a second interface for receiving and outputting parameter data to be used in the data processing performed with the core module, and outputting information regarding the core module; a third interface for initializing an environment and a state for the data processing performed with the core module, and releasing the environment; and a query interface for notifying static entries of the first interface, the second interface, and the third interface, to the software framework for enabling the software framework to access the first interface, the second interface, and the third interface, in a common procedure with respect to other ones of the data processing modules.

BRIEF DESCRIPTION OF THE DRAWINGS

In the accompanying drawings:

FIG. 6 is an example of a command list used in the Property in the data processing module applied to the AAC decoder as the fifth embodiment;

FIG. 7 is an example of an operation program in the data processing module applied to the AAC decoder as the fifth embodiment;

DETAILED DESCRIPTION OF THE EMBODIMENTS

Figure 1:
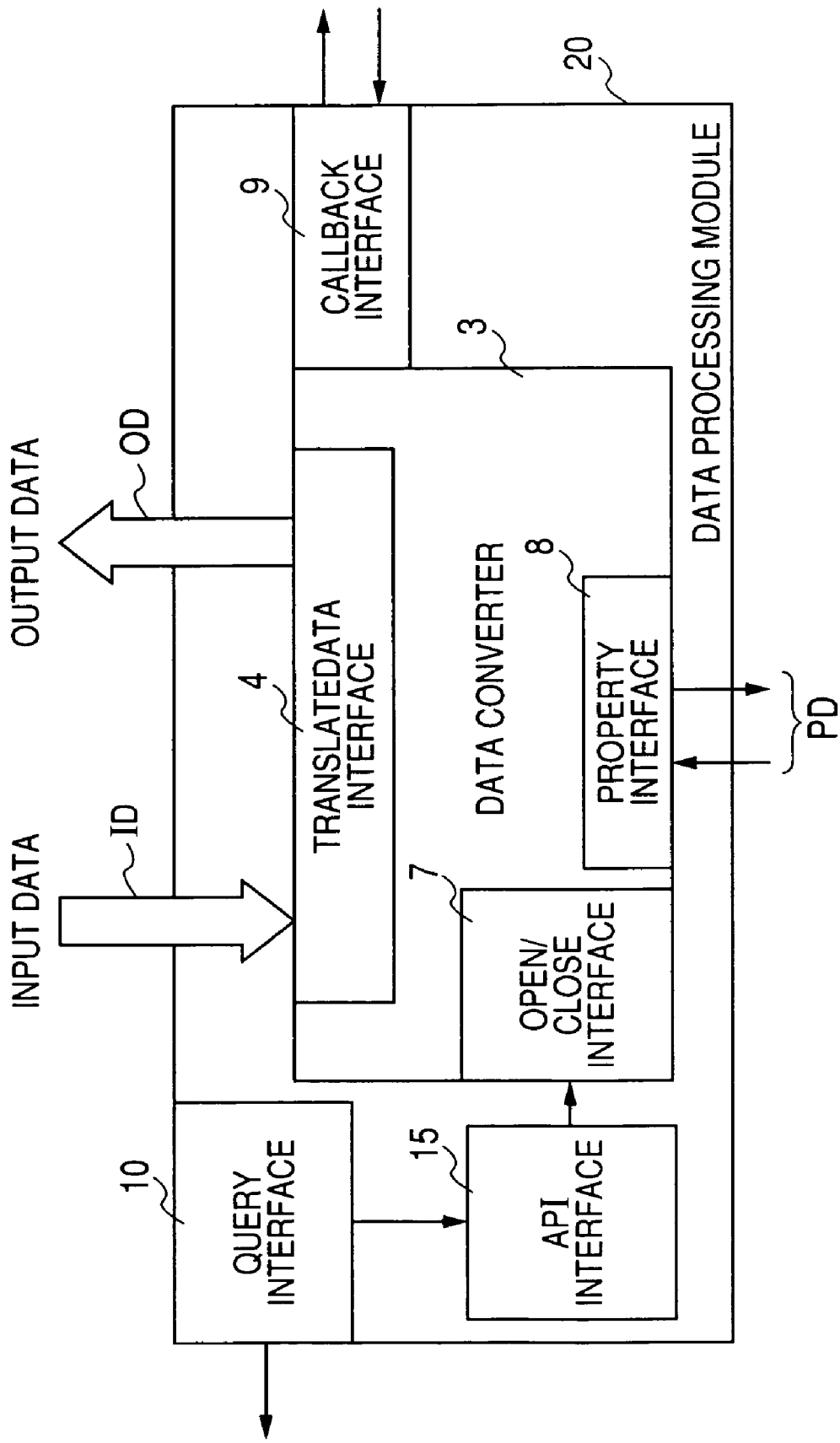
FIG. 1 is a schematic block diagram of a data processing module according to a first embodiment.

Referring now to the accompanying drawings, there are shown embodiments of the invention. In the following description, parts common among embodiments or examples are denoted by the same reference numerals correspondingly, and redundant description will be avoided. Respective diagrams to be referred to are schematic diagrams for explaining the invention and promoting understanding of the invention. For the sake of convenience of illustration in the drawings, there may be differences in shape, size, ratio, etc. from a real apparatus. These differences may be changed on design suitably in consideration of the following description and the known techniques.

A data processing module according to the embodiments of the invention realizes the function of a data converter for performing data conversion such as codec with software program. The data converter is regarded as a single module, and is composed of a data input function, a data output function, and a control parameter for controlling the data input function and the data output function. Since the control parameter is expressed by a character string or a numerical string including numerical value, it is easy to perform addition or deletion on the control parameter. Therefore, the data processing module can be applied to a software library for performing input and output of data.

The data processing module according to the embodiments of the invention can be applied to all of the libraries accompanying input and output of data. Further, since the parameter can be determined as desired, it can easily be extended.

The data processing module according to the embodiments, which treats a command as a character string or numerical string, can be modified or extended in the function while minimizing the influence to the surrounding environment and without affecting an API interface.

Since the interface for accessing each of the data processing modules is prepared in common with each of the data processing modules, connection or recombination of the data processing modules in code level is simple and easy to understand. Moreover, since all of the interfaces have the same schemes, the connection procedures can be unified and simplified by describing a predetermined procedure. Still further, it can be applied not only to a data processing module but also to a module provided only with a control system.

First Embodiment

Herein, a system 100 for performing data processing will be described as a first embodiment.

Figure 9:
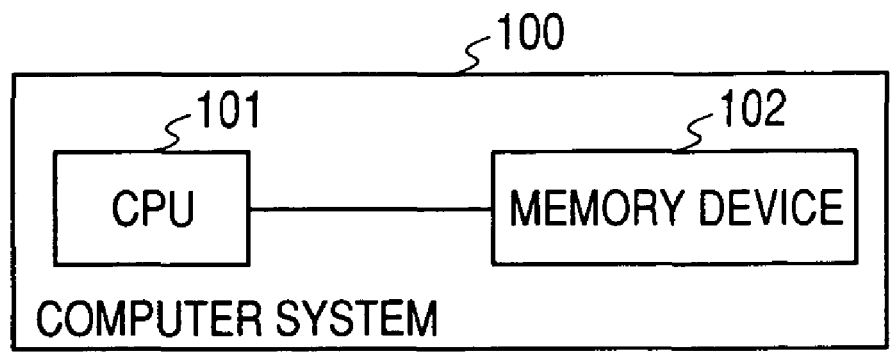
FIG. 9 is a schematic block diagram of a computer system according to the first embodiment.

The system 100 is, as shown in FIG. 9, configured as a computer system that includes a processing unit (CPU) 101 and a memory device 102 that is connected to the CPU 101 and provides a work area for software programs performed by the CPU 101.

Figure 10:
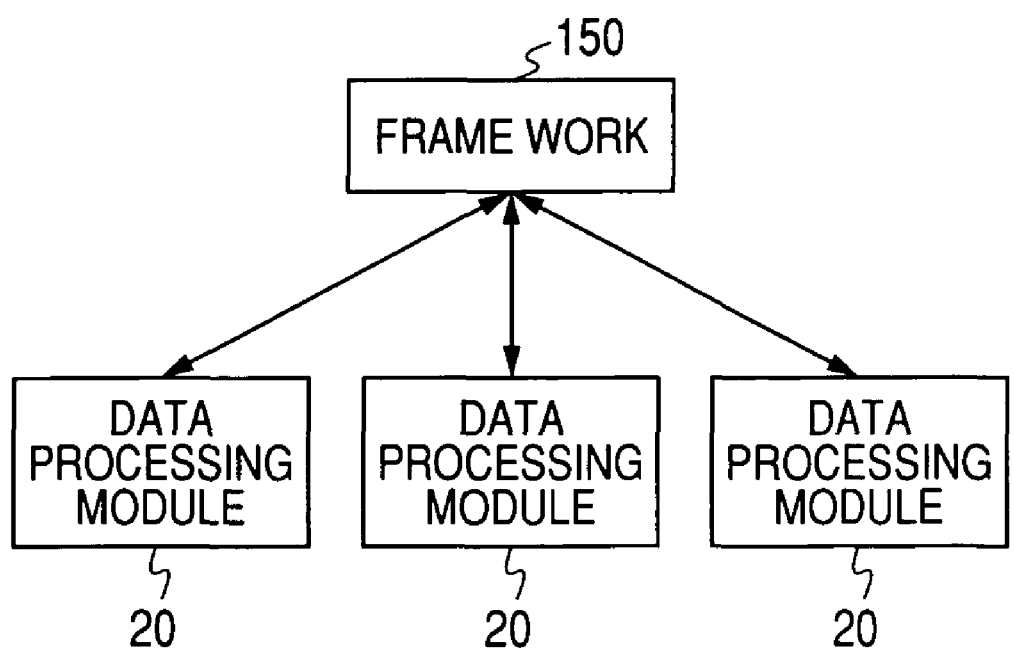
FIG. 10 is a schematic diagram of a software configuration in the computer system according to the first embodiment.

The CPU 101 performs data processing in accordance with a plurality of data processing modules 20 and a software framework 150, as shown in FIG. 10.

Each of the data processing modules 20 includes, as shown in FIG. 1, a data converter 3 as a black box. The data converter 3 includes: a TranslateData interface 4 for receiving input data ID and sending output data OD; and a Property interface 8 for sending and receiving parameter data PD composed of a character string parameter for Property control. The data converter 3 further includes: an Open/Close interface 7 for initializing the environment and the state; a query interface 10 for obtaining entries of the internal interfaces of the Open/Close interface 7, the TranslateData interface 4, and the Property interface 8; and an API interface 15 for dynamically obtaining by the query interface 10 the four kinds of interfaces of the Open, Close, Property, and TranslateData, and a callback (interrupt) interface 9 designated by the Property interface 8.

Note here that the data converter 3 includes: the TranslateData interface 4 also used as an input/output interface; the Property interface 8 for receiving parameter data PD composed of the character string parameter for the Property control; and the Open/Close interface 7 for initializing the Open/Close.

In the embodiment, the data converter 3 serves as a core module that performs data processing on input data and generates output data.

The TranslateData interface 4 additionally includes the functions of the input and output interfaces. The actual data conversion is performed by the TranslateData interface 4.

In the embodiment, the TranslateData interface 4 serves as a first interface that receives the input data and outputs the output data.

The Open/Close interface 7 initializes the environment and the state, and performs operation environment setting.

In the embodiment, the Open/Close interface 7 serves as a third interface that initializes an environment and a state for the data processing performed by the core module, and releases the environment.

The Open/Close interface 7 allocates an address space in the memory device 102 and sets the parameter data to a default value, in accordance with a request made by the controller. The Open/Close interface 7 releases the allocated address space, in accordance with a request made by the controller.

The query interface 10 is a static external interface for firstly communicating with external modules or the framework 150, and is uniquely provided to each of the data processing modules 20. The entries of the internal interfaces of the Open/Close interface 7, the TranslateData interface 4, and the Property interface 8 in the data converter 3 are obtained via the query interface 10, thereby allowing access to the four interfaces.

As shown in FIG. 1, the TranslateData interface 4 used also as the input/output interface and for receiving the input data ID and sending the output data OD and the Property interface 8 for sending and receiving the parameter data PD perform passive control from the standpoint of the data processing module 20, and perform passive action for performing processing as instructed.

In the embodiment, the Property interface 8 serves as a second interface that receives parameter data to be used in the data processing performed by the core module, and outputs information regarding the core module.

The callback (interrupt) interface 9 performs requisition control from the standpoint of the data processing module 20, and performs active action of requiring an instruction to a module or the framework 150 provided superordinate to the data processing module 20. That is, the callback interface 9 performs active action for performing requisition control directed to the module or the framework 150 that are superordinate to the data processing module 20.

In the embodiment, the callback interface 9 serves as a fourth interface that performs active action for performing requisition control directed to the framework 150 or to one of other data processing modules.

The API interface 15 is configured as an interface for dynamically obtaining by the query interface 10 the four kinds of interfaces, namely the Open, Close, Property, and TranslateData.

In the embodiment, the query interface 10 serves as a query interface for notifying static entries of the first interface, the second interface, and the third interface, to the software framework 150 for enabling the software framework 150 to access the first interface, the second interface, and the third interface, in a common procedure with respect to other ones of the data processing modules.

In the embodiment, the query interface 10 is configured as a function pointer that performs a query to the API interface 15.

The data processing module 20 according to the first embodiment corresponds to an implementation example of the data converter 3. Note here that the data converter 3 and all of the data processing modules 20 relating to the data converter 3 are called IP modules.

The API interface 15 is configured as four kinds of interfaces of Open, Close, Property, and TranslateData, and is dynamically accessed through the query interface 10.

Every access to one of the data converter 3 and the IP modules relating to the data converter 3 is performed via the API interface 15 accessed through the query interface 10.

The API interface 15 is common to all of the IP modules, the number thereof is fixed, and the argument (parameters) thereof is also defined in common with other modules.

In the data processing module 20 applied to the data converter 3 as the first embodiment, the API interface 15 including the four kinds of interfaces of the Open, Close, Property, and TranslateData, is configured to be common to all of the IP modules.

The data processing module 20 according to the first embodiment is provided with a configuration having one interface get function, and a plurality of interfaces included in the data converter, thus making it easy to implement the static software library modules to a built-in apparatus.

Further, a plug-in structure, in which only one external interface is implemented in each of the data processing modules, and plural interfaces actually used are dynamically obtained, is provided.

Further, it can be applied to all of the modules having data input and data output, and performing data conversion such as various multimedia codec middleware.

Further, it can also be applied to software library modules having input data and output data.

Still further, by unifying the number of interfaces and usage of the interfaces through out the modules, the modules can easily be independent and formed as components. Since all of the interfaces of each of the modules are unified, they can easily be built into a structure just like building blocks.

Further, communication of commands in each of the modules can fully be carried out with character-string-based or numerical-string-based commands. Since the definition of the command can be determined as desired, the function can be extended or added without correcting external interfaces. Further, since the commands are composed of character strings, a plurality commands can be designated at the same time.

In the data processing module 20 according to the first embodiment, the data converter 3 accompanying data input/output such as a codec is regarded as a single module, and is treated as a black box.

The explanation is made with a typical data flow in FIG. 1. It is assumed that a certain parameter data PD for controlling the data converter 3 is present in the data converter 3 with a certain input data ID and a certain output data OD.

The parameter data PD is expressed by a text character string (character string) or a numerical value (numerical string), and the operation of the data converter 3 as the module is determined or controlled by the text character string or a numerical value.

Since the parameter data PD for controlling the data converter 3 is configured as a character string or a numerical string, addition or deletion can easily be performed regardless of the data structure, thus enhancing independence of the module.

Since there are only the TranslateData interface 4 that serves as a port for data input/output and the Property interface 8 that serves as a port for parameter input/output, as the interfaces provided in the data converter 3, the data processing module 20 is simply configured from an aspect of interfaces.

Using the interface composed of the TranslateData interface 4 and Property interface 8, various controls of various data are controlled in accordance with a command input through the Property interface 8.

The Open/Close interface 7, the TranslateData interface 4, and the Property interface 8 are configured to obtain internal interface entries from the query interface 10 to perform the control.

The data processing module 20 has the query interface 10 through which the TranslateData interface 4, the Property interface 8, and the Open/Close interface 7 obtains an internal interface entry.

Accordingly, it would be sufficient to define only one external interface (the query interface 10) for each of the data processing modules 20, thus facilitating the implementation of the data processing module 20. Further, the interface group obtained by each of the data modules 20 is fixed, and accordingly, the data processing module 20 can be used by a single procedure. Since some of the modules such as a driver cannot be realized without dynamically giving the control to the upper, a scheme in which the Property interface 8 can designate the callback interface 9 is prepared.

The data processing module according to the first embodiment realizes the function of the data converter for performing data conversion such as codec with software program. The data converter is regarded as a single module, and is composed of a data input function, a data output function, and a control parameter for controlling the data input function and the data output function. Since the control parameter is expressed by a character string, addition and deletion thereof can easily be performed.

The data processing module according to the first embodiment can be applied to all of the libraries accompanying input and output of data. Further, since the parameter can be determined as desired, it can easily be extended. Still further, the data processing module according to the first embodiment, which treats a command as a character string or a numerical string, can easily be modified or extended in the function while minimizing the influence to the surrounding environment and without affecting the API interface. Further, since the interface is determined, connection or recombination thereof in code level can easily be preformed and easy to understand. Moreover, since all of the interfaces have the same schemes, the connection procedures can be unified and simplified by describing a predetermined procedure.

Second Embodiment

Figure 2:
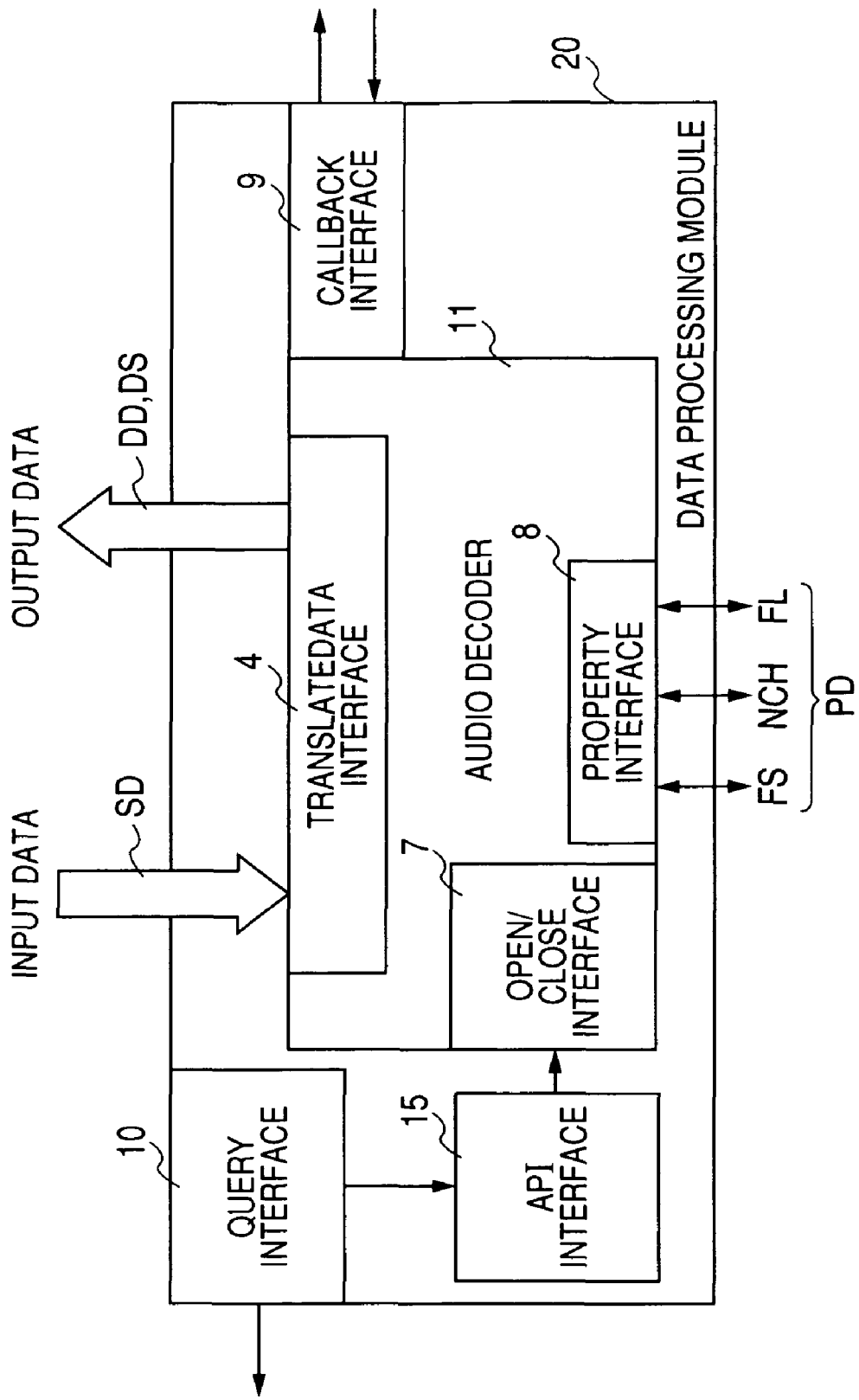
FIG. 2 is a schematic block diagram of a data processing module applied to an audio decoder as a second embodiment.

The data processing module 20 applied to an audio decoder 11 (core module) according to a second embodiment includes, as shown in FIG. 2, the audio decoder 11 as a black box. The audio decoder 11 includes: the TranslateData interface 4 for receiving coded compressed streaming data SD input thereto as input data and sending linear PCM data DD and the output data size DS thereof as output data; the Property interface 8 for sending and receiving parameter data PD composed of a character string parameter for Property control; and the Open/Close interface 7 for initializing the environment and the state. The data processing module 20 further includes: the query interface 10 for obtaining entries of the internal interfaces of the Open/Close interface 7, the TranslateData interface 4, and the Property interface 8; the API interface 15 for dynamically obtaining by the query interface 10 the four kinds of interfaces of the Open, Close, Property, and TranslateData; and the callback interface 9 designated by the Property interface 8.

The TranslateData interface 4 additionally includes the functions of the input and output interfaces. The actual data conversion is performed by the TranslateData interface 4.

The Open/Close interface 7 initializes the environment and the state, and performs operation environment setting.

The query interface 10 is a static external interface for firstly communicating with external modules or a framework 150, and is uniquely provided to each of the data processing modules 20. The entries of the internal interfaces of the Open/Close interface 7, the TranslateData interface 4, and the Property interface 8 in the audio decoder 11 are obtained via the query interface 10, thereby allowing access the four interfaces.

As shown in FIG. 2, the TranslateData interface 4 used also as the input/output interface and for receiving the input data ID and sending the output data OD and the Property interface 8 for sending and receiving the parameter data PD perform passive control from the standpoint of the data processing module 20, and perform passive action for performing processing as instructed.

The callback (interrupt) interface 9 performs requisition control from the standpoint of the data processing module 20, and performs active action of requiring an instruction to a module or the framework 150 provided superordinate to the data processing module 20.

The API interface 15 is configured as an interface for dynamically obtaining by the query interface 10 the four kinds of interfaces, namely the Open, Close, Property, and TranslateData.

The data processing module 20 according to the second embodiment corresponds to an implementation example of the audio decoder 11. Note here that the audio decoder 11 and all of the data processing modules 20 relating to the audio decoder 11 are called IP modules.

The API interface 15 is configured as four kinds of interfaces of Open, Close, Property, and TranslateData, and is dynamically accessed through the query interface 10.

Every access to one of the audio decoder 11 and the IP modules relating to the audio decoder 11 is performed via the API interface 15 accessed through the query interface 10.

The API interface 15 is common to all of the IP modules, the number thereof is fixed, and the argument thereof is also defined in common with other modules.

In the data processing module 20 applied to the audio decoder 11 as the second embodiment, the API interface 15 including the four kinds of interfaces of the Open, Close, Property, and TranslateData, is configured to be common to all of the IP modules.

In the data processing module 20 applied to the audio decoder 11 as the second embodiment, the input includes the compressed streaming data SD, the output includes the decompressed data (the decoded linear PCM data) DD and the output data size DS thereof, and the parameter data PD includes the sampling frequency Fs, the number of channels NCH, the used frame size FL used in decoding.

The TranslateData interface 4 performs the data conversion.

The parameter data PD is expressed in the form of a command of text (character string) or a numeric value (numeric string), and can be sent or read out with a desired arrangement.

In the data processing module 20 applied to the audio decoder 11 as the second embodiment, by arranging necessary parameters for each module as a common command, it is possible that only the module requiring the common command information receives the common command information to determine the operation. In this case, any undefined parameters can be ignored.

In the data processing module 20 applied to the audio decoder 11 as the second embodiment, the entire control is performed only with two interfaces, the TranslateData interface 4 and the Property interface 8.

The data processing module according to the second embodiment realizes the data conversion function of the audio decoder 11 with software. The audio decoder 11 is regarded as a single module, and is composed of a data input function, a data output function, and a control parameter for controlling the data input function and the data output function. Since the control parameter is expressed by a character string, addition and deletion thereof can easily be performed.

The data processing module 20 according to the second embodiment can be applied to all of the libraries accompanying input and output of data. Further, since the parameter can be determined as desired, it can easily be extended.

Further, since the data processing module 20 according to the second embodiment handles the command of the parameter data PD including the sampling frequency Fs of the audio parameter, the number of channels NCH, and the used frame size FL with a character string or a numerical string, modification or extension of the function can be performed while minimizing influence to the surrounding environment without affecting the API interface. Further, since the interface is determined, connection or recombination thereof in code level can easily be performed. Further, since the interface is determined, connection or recombination thereof in code level can easily be preformed and easy to understand. Moreover, since all of the interfaces have the same schemes, the connection procedures can be unified and simplified by describing a predetermined procedure.

Third Embodiment

Figure 3:
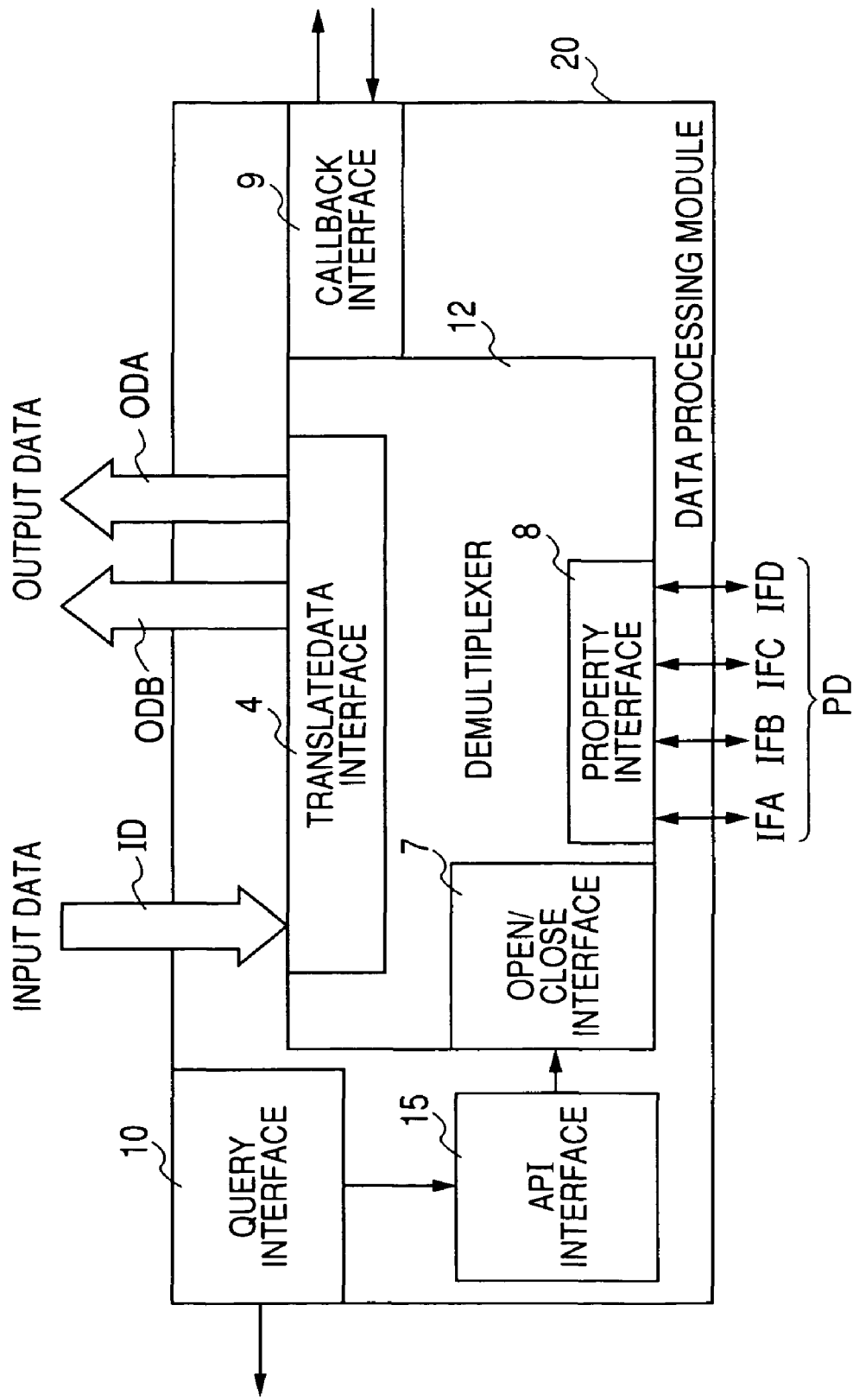
FIG. 3 is a schematic block diagram of a data processing module applied to a demultiplexer as a third embodiment.

The data processing module 20 applied to a demultiplexer (core module) 12 according to a third embodiment includes, as shown in FIG. 3, the demultiplexer 12 as a black box. The demultiplexer 12 includes the TranslateData interface 4 for receiving input data ID and sending separated output data ODA, ODB; the Property interface 8 for sending and receiving the parameter data PD composed of information IFA through IFD for Property control; and the Open/Close interface 7 for initializing the environment and the state. The data processing module 20 further includes the query interface 10 for obtaining entries of the internal interfaces of the Open/Close interface 7 the TranslateData interface 4, and the Property interface 8; the API interface 15 for dynamically obtaining by the query interface 10 the four kinds of interfaces of the Open, Close, Property, and TranslateData; and the callback interface 9 designated by the Property interface 8.

The TranslateData interface 4 additionally includes the functions of the input and output interfaces. The actual data conversion is performed by the TranslateData interface 4.

The Open/Close interface 7 initializes the environment and the state, and performs operation environment setting.

The query interface 10 is a static external interface for firstly communicating with external modules or a framework 150, and is uniquely provided to each of the data processing modules 20. The entries of the internal interfaces of the Open/Close interface 7, the TranslateData interface 4, and the Property interface 8 in the demultiplexer 12 are obtained via the query interface 10, thereby allowing access to the four interfaces.

As shown in FIG. 3, the TranslateData interface 4 used also as the input/output interface and for receiving the input data ID and sending the separated output data ODA, ODB and the Property interface 8 for sending and receiving the parameter data PD composed of information IFA through IFD perform passive control from the standpoint of the data processing module 20 to perform passive action for performing processing as instructed.

The callback (interrupt) interface 9 performs requisition control from the standpoint of the data processing module 20, and performs active action of requiring an instruction to a module or the framework 150 provided superordinate to the data processing module 20.

The API interface 15 is configured as four kinds of interfaces of Open, Close, Property, and TranslateData, and is dynamically accessed through the query interface 10.

The data processing module 20 according to the third embodiment corresponds to an implementation example of the demultiplexer 12. Note here that demultiplexer 12 and all of the data processing modules 20 relating to the demultiplexer 12 are called IP modules.

The API interface 15 is configured as four kinds of interfaces of Open, Close, Property, and TranslateData, and is dynamically accessed through the query interface 10.

Every access to one of the demultiplexer 12 and the IP modules relating to the demultiplexer 12 is performed via the API interface 15 accessed through the query interface 10.

The API interface 15 is common to all of the IP modules, the number thereof is fixed, and the argument thereof is also defined in common with other modules.

In the data processing modules 20 applied to the demultiplexer 12 as the third embodiment, the API interface 15 including the four kinds of interfaces of the Open, Close, Property, and TranslateData, is configured to be common to all of the IP modules.

In the data processing module 20 applied to the demultiplexer 12 as the third embodiment also makes data conversion possible for obtaining plural outputs from a single input, a single output from plural inputs, or plural outputs from plural inputs.

The data processing module 20 applied to the demultiplexer 12 according to the third embodiment is shown in FIG. 3 as an example having plural outputs to one input of the demultiplexer 12.

In the data processing module 20 applied to the demultiplexer 12 as the third embodiment, the configuration having plural separated output interfaces 21, 22 (not shown) is carried out by making the arrangement of the output ports of the TranslateData interface 4 definable, and making it possible to designate a data string as desired.

As a modified example of the third embodiment, the configuration of the data processing module having one output to plural inputs such as a data processing module applied to a multiplexer or the like can be formed similarly to the third embodiment.

The plural output data ODA, ODB are output in accordance to the input data ID via the TranslateData interface 4.

The information, which the demultiplexer 12 could obtain, can be obtained by the Property interface 8 at any time.

The data processing module according to the third embodiment realizes the data conversion function of the demultiplexer 12 with software program. The demultiplexer 12 is regarded as a single module, and is composed of a data input function, a data output function, and a control parameter for controlling the data input function and the data output function. Since the control parameter is expressed by a character string, addition and deletion thereof can easily be performed.

The data processing module according to the third embodiment can be applied to all of the libraries accompanying input and output of data. Further, since the parameter can be determined as desired, it can easily be extended.

Further, since the data processing module according to the third embodiment handles the command of the parameter data PD composed of the information IFA through IFD for controlling the demultiplexer 12 with a text character string, modification or extension of the function can be performed while minimizing influence to the surrounding environment without affecting the API interface. Further, since the interface is determined, connection or recombination thereof in code level can easily be preformed and easy to understand. Moreover, since all of the interfaces have the same schemes, the connection procedures can be unified and simplified by describing a predetermined procedure.

Fourth Embodiment

Figure 4:
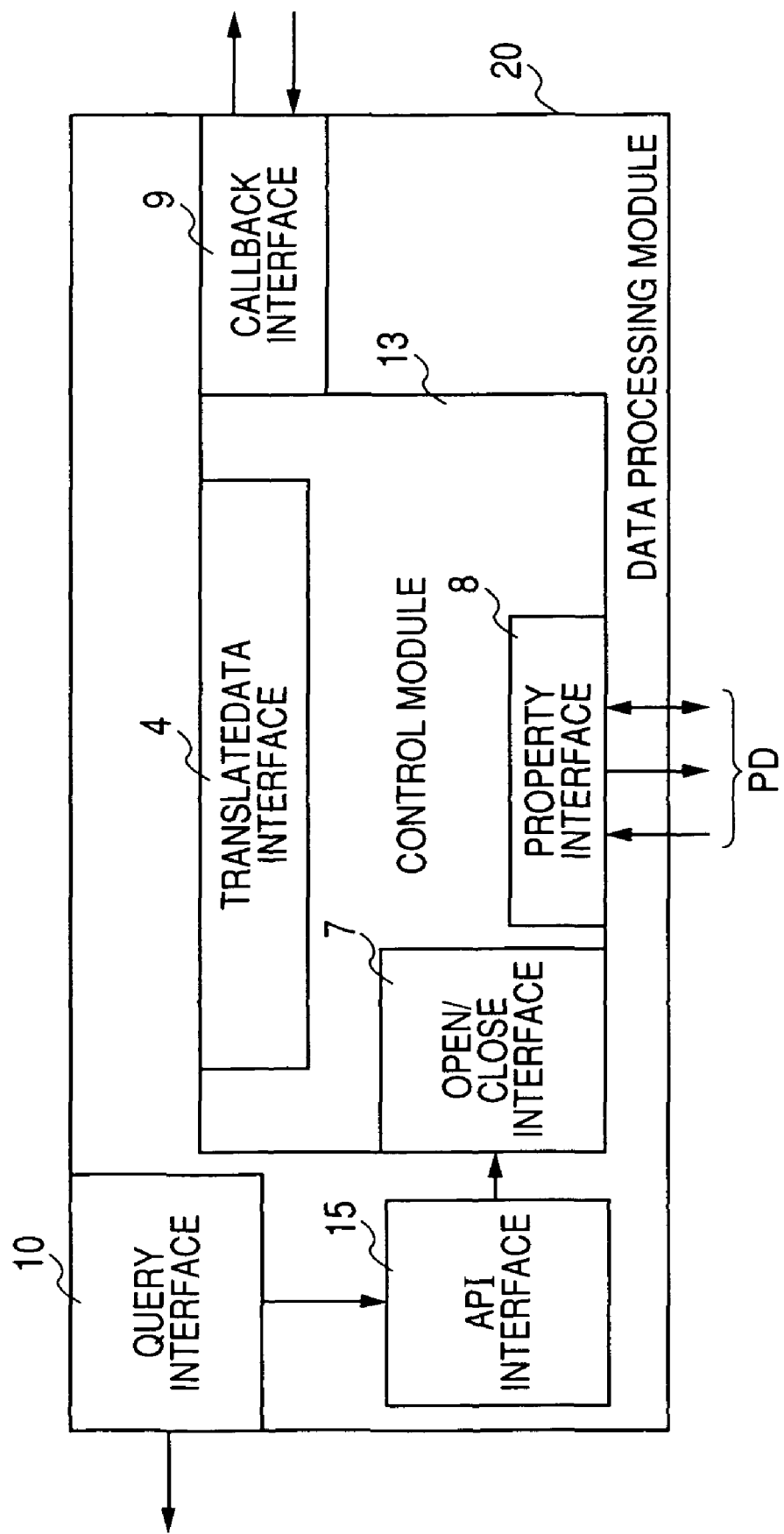
FIG. 4 is a schematic block diagram of a data processing module applied to a control module as a fourth embodiment.

The data processing module 20 applied to a control module (core module) 13 according to a fourth embodiment includes, as shown in FIG. 4, the control module 13 for null data conversion. The control module 13 includes: the Property interface 8 for sending and receiving the parameter data PD composed of a character string parameter for Property control; and the Open/Close interface 7 for initializing the environment and the state. The control module 13 performs only the control not accompanying data conversion. The data processing module 20 further includes: the query interface 10 for obtaining entries of the internal interfaces of the Open/Close interface 7 and the Property interface 8; the API interface 15 for dynamically obtaining by the query interface 10 the four kinds of interfaces of the Open, Close, Property, and TranslateData; and the callback (interrupt) interface 9 designated by the Property interface 8.

The control module 13 is provided only with a control system as a null data converting module not performing any data conversion.

In the Property interface 8, various controls of the various data are controlled in accordance with commands of character string or numerical string.

The same modularization as in the data processing module 20 according to the first through third embodiments can be applied to the control module 13 that performs no input/output for data conversion. In the fourth embodiment, existence of the TranslateData interface 4 has no meaning, and the TranslateData interface 4 does not function at all.

The callback (interrupt) interface 9 performs requisition control from the standpoint of the data processing module 20, and performs active action of requiring an instruction to a module or the framework 150 provided superordinate to the data processing module 20.

The API interface 15 is configured as an interface for dynamically obtaining by the query interface 10 the four kinds of interfaces, namely the Open, Close, Property, and TranslateData.

The data processing module 20 according to the fourth embodiment corresponds to an implementation example of the control module 13. Note here that the control module 13 and all of the data processing modules 20 relating to the control module 13 are called IP modules.

The query interface 10 dynamically obtains the four kinds of interfaces of Open, Close, Property, and TranslateData.

The API interface 15 is configured as four kinds of interfaces of Open, Close, Property, and TranslateData, and is dynamically accessed through the query interface 10.

Every access to one of the control module 13 and the IP modules relating to the control module 13 is performed via the API interface 15 accessed through the query interface 10.

The API interface 15 is common to all of the IP modules, the number thereof is fixed, and the argument thereof is also defined in common with other modules.

In the data processing modules 20 applied to the control module 13 as the fourth embodiment, the API interface 15 including the four kinds of interfaces of the Open, Close, Property, and TranslateData, is configured to be common to all of the IP modules.

The data processing module 20 according to the fourth embodiment performs the control only with the parameter data PD for controlling the control module 13 and the Property interface 8 for the Property control of the control module 13. The data processing module 20 is provided only with the control system as the control module not accompanying data conversion, and defined as the null module including no data input/output.

As a modified example of the fourth embodiment, the control module 13 provided only with the control system and composed of a multitasking monitor or a timer driver can similarly be configured.

The data processing module according to the fourth embodiment realizes the control function of the control module 13 not at all accompanying input/output for data conversion with software. The control module 13 not at all accompanying input/output for data conversion is regarded as a single module, and is provided with a control parameter for controlling the control module 13. Since the control parameter is expressed by a character string or a numerical string, addition and deletion thereof can easily be performed.

The data processing module according to the fourth embodiment can be applied to all of the libraries not accompanying data input/output. Further, since the parameter can be determined as desired, it can easily be extended.

Further, since the data processing module according to the fourth embodiment handles the command of the parameter data PD for controlling the control module 13 with a character string or a numerical string, modification or extension of the function can be performed while minimizing influence to the surrounding environment without affecting the API interface. Further, since the interface is determined, connection or recombination thereof in code level is simple and easy to understand. Moreover, since all of the interfaces have the same schemes, the connection procedures can be unified and simplified by describing a predetermined procedure.

Fifth Embodiment

Figure 5:
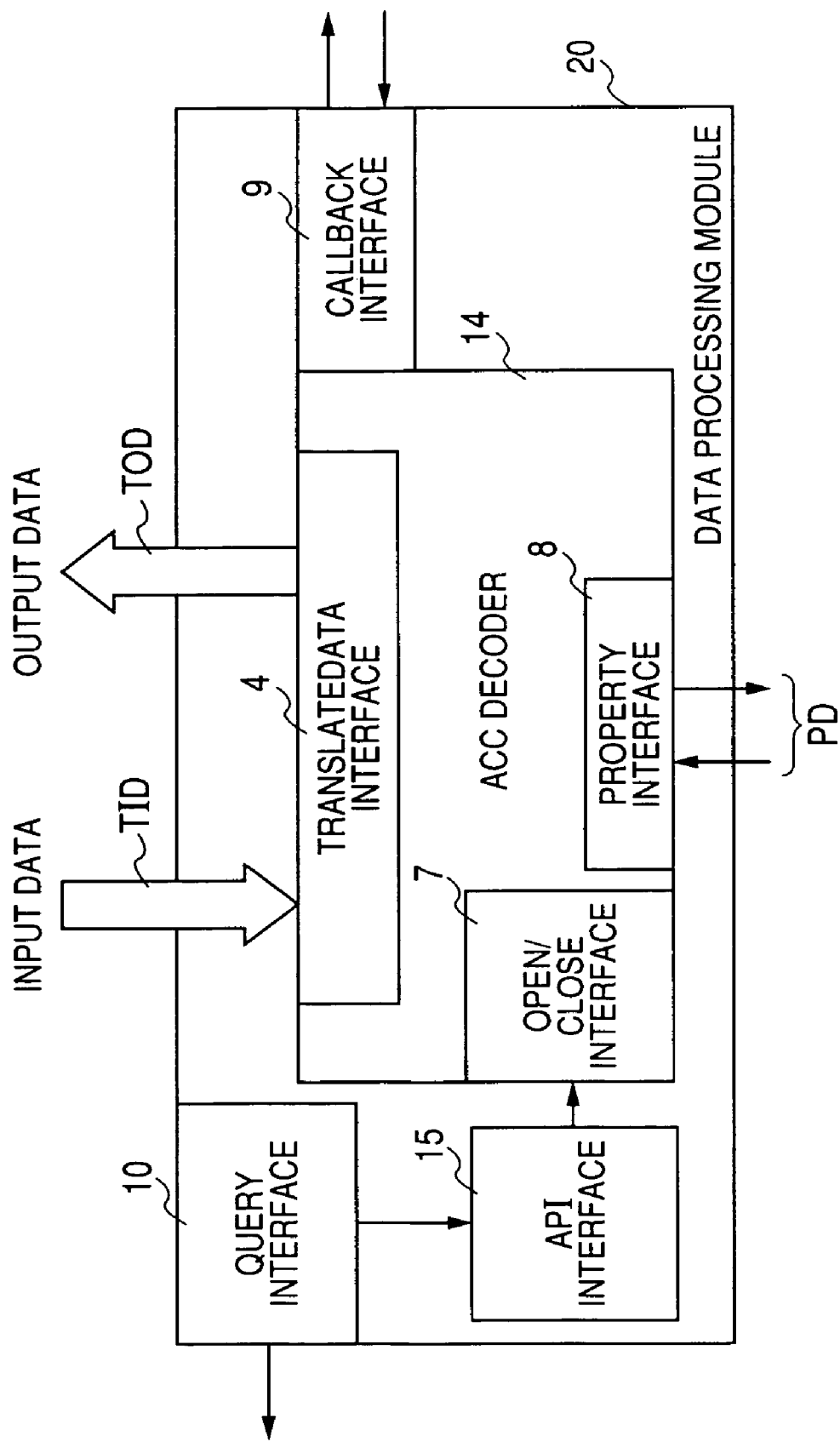
FIG. 5 is a schematic block diagram of a data processing module applied to an AAC decoder as a fifth embodiment.

A data processing module 20 applied to an advanced audio coding (AAC) decoder (core module) 14 according to a fifth embodiment includes, as shown in FIG. 5, the AAC decoder 14 as a black box. The AAC decoder 14 includes: the TranslateData interface 4 for receiving input TranslateData TID and sending output TranslateData TOD; the Property interface 8 for sending and receiving parameter data PD composed of a character string parameter for Property control; and the Open/Close interface 7 for initializing the environment and the state. The data processing module 20 further includes: the query interface 10 for obtaining entries of the internal interfaces of the Open/Close interface 7, the TranslateData interface 4, and the Property interface 8; the API interface 15 for dynamically obtaining by the query interface 10 the four kinds of the Open, Close, Property, and TranslateData; and a callback (interrupt) interface 9 designated by the Property interface 8. The Property interface 8 sets the sampling frequency necessary for decoding, the number of channels, the number of sample frames, and the AAC mode for decoding with a command for controlling the AAC decoder 14.

Note here that the AAC decoder 14 includes the TranslateData interface 4 also used as an input/output interface, the Property interface 8 for receiving parameter data PD composed of the character string parameter for the Property control, and the Open/Close interface 7 for initializing the Open/Close.

The TranslateData interface 4 additionally includes the functions of the input and output interfaces. The actual data conversion is performed by the TranslateData interface 4.

The Open/Close interface 7 initializes the environment and the state, and performs operation environment setting.

The query interface 10 is a static external interface for firstly communicating with external modules or a framework 150, and is uniquely provided to each of the data processing modules 20. The entries of the internal interfaces of the Open/Close interface 7, the TranslateData interface 4, and the Property interface 8 inside the AAC decoder 14 are obtained via the query interface 10, thereby allowing access to the four interfaces.

As shown in FIG. 5, the TranslateData interface 4 used also as the input/output interface and for receiving the input TranslateData TID and sending the output TranslateData TOD and the Property interface 8 for sending and receiving the parameter data PD perform passive control from the standpoint of the data processing module 20, and perform passive action for performing processing as instructed.

The callback (interrupt) interface 9 performs requisition control from the standpoint of the data processing module 20, and performs active action of requiring an instruction to a module or the framework 150 provided superordinate to the data processing module 20.

The API interface 15 is configured as four kinds of interfaces of Open, Close, Property, and TranslateData, and is dynamically accessed through the query interface 10.

The data processing module 20 according to the fifth embodiment corresponds to an implementation example of the AAC decoder 14. A specific example implementing the AAC decoder 14 will hereinafter be explained.

Note here that the AAC decoder 14 and all of the data processing modules 20 relating to the AAC decoder 14 are called IP modules.

The API interface 15 is configured as four kinds of interfaces of Open, Close, Property, and TranslateData, and is dynamically obtained through the query interface 10.

Every access to one of the AAC decoder 14 and the IP modules relating to the AAC decoder 14 is performed via the API interface 15 accessed through the query interface 10.

The API interface 15 is common to all of the IP modules, the number thereof is fixed, and the argument thereof is also defined in common with other modules.

In the data processing modules 20 applied to the AAC decoder 14 as the fifth embodiment, the API interface 15 including the four kinds of interfaces of the Open, Close, Property, and TranslateData, is configured to be common to all of the IP modules.

An example of the command list used in the Property for the data processing module 20 is shown in FIG. 6.

An example of the operation program that functions as the data processing module 20 is shown in FIG. 7.

Figure 8:
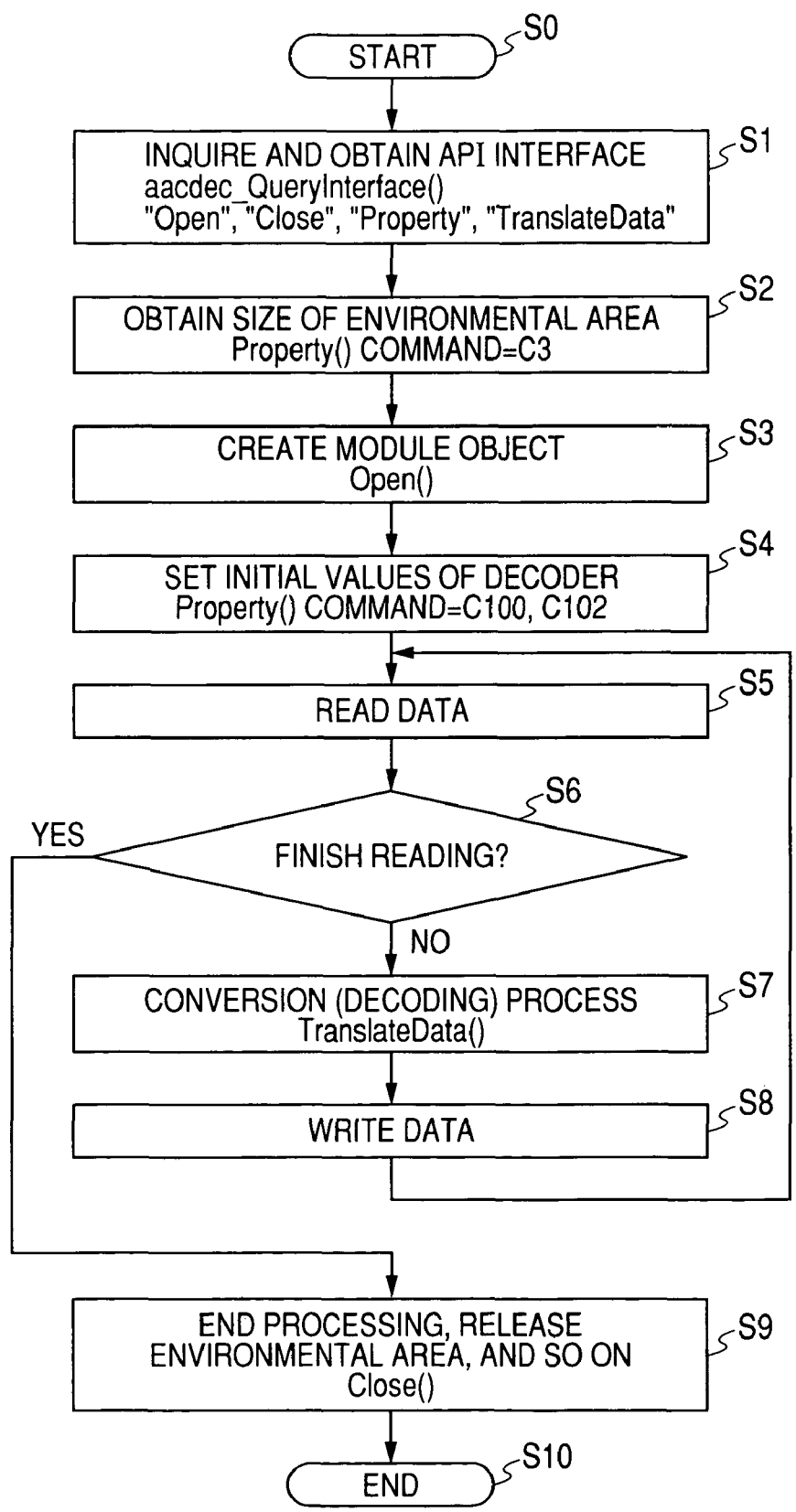
FIG. 8 is an example of an operation flowchart in the principal section in the data processing module applied to the AAC decoder as the fifth embodiment.

An example of the operation flowchart in the principal part of the operation program shown in FIG. 7 is shown in FIG. 8.

The operations of the data processing module 20 applied to the AAC decoder 14 according to the fifth embodiment will hereinafter be explained.

(a) First, the operation starts at step S0.

(b) Next, in step S1, inquiry to the API interface for dynamically obtaining the four kinds of interfaces, namely the Open, Close, Property, and TranslateData by the query interface 10 is performed.

(c) Next, in step S2, an environment size used in the IP module of the AAC decoder 14 is obtained using the command "C3" of the Property interface 8.

(d) Next, in step S3, a module object is generated, and the environment thereof is passed to the AAC decoder 14 using the Open of the API interface 15. As an environmental area, a memory area provided by an upper application program is used, and the IP module of the AAC decoder 14 itself always uses the passed environment as a working area. Since the environmental area can independently be set Open, plural objects having the same functions can be generated, thus a thread safe structure can be formed. Subsequently, the IP module of the AAC decoder 14 performs all of the operations in the area as the working area.

(e) Next, in step S4, initial value setting of the AAC decoder 14 is performed. For example, the sampling frequency Fs necessary for decoding is set by the command "C100" of the Property interface 8, the number of channels NCH is set by the command "C101," the number of sample frames is set by the command "C102," and the AAC mode for decoding is set by the command "C403."

(f) Next, in step S5, the AAC decoder 14 reads the input TranslateData TID.

(g) Next, in step S6, whether or not the AAC decoder 14 has finished reading the input TranslateData TID is determined.

(h) Next, in step S6, if the result of the determination is NO, then the process proceeds to the step S7, and the actual data conversion is performed in the TranslateData interface 4. Specifically, the input TranslateData TID input thereto, which is RAW data of the AAC decoder 14, is passed to the TranslateData interface 4, and the PCM data is output as the output TranslateData TOD, the result of the data conversion. The frame size FL used in the input becomes the input size of the TranslateData interface 4. Further, in order for making it possible to obtain the frame size FL used in the last data conversion, a method of obtaining the size by the command "C300" of the Property interface 8 is also prepared.

(i) Next, in step S8, the output TranslateData TOD as the result of the data conversion is written out, and the process returns to the step S5. In this loop process, the data conversion is continued by shifting the data as much as the size of the data frame used in the input and passing the result again to the TranslateData interface 4.

(j) When, in step S6, the result of the determination is YES, the process proceeds to step S9, and the Close process, the process of opening the environment and so on are performed.

(k) Next, in step S10, the IP module of the AAC decoder 14 is terminated.

The data processing module 20 according to the fifth embodiment realizes the data conversion function of the AAC decoder 14 with software. The AAC decoder 14 is regarded as a single module, and is composed of a data input function, a data output function, and a control parameter for controlling the data input function and the data output function. Since the control parameter is expressed by a character string, addition and deletion thereof can easily be performed.

The data processing module 20 according to the fifth embodiment can be applied to all of the libraries accompanying data input and data output. Further, since the parameter can be determined as desired, it can easily be extended. Still further, the data processing module 20 according to the fifth embodiment, which treats a command as a character string or a numerical string, can be modified or extended in the function while minimizing the influence to the surrounding environment and without affecting the API interface. Further, since the interface is determined, connection or recombination thereof in code level can easily be preformed and easy to understand. Moreover, since all of the interfaces have the same schemes, the connection procedures can be unified and simplified by describing a predetermined procedure.

Sixth Embodiment

In the embodiments described above, there are explained that the data processing modules 20 are implemented as software modules. However, the data processing modules 20 may be implemented as hardware modules as described in below.

Herein, a semiconductor device 200 is described with reference to FIG. 11 as an example for implementing the data processing modules 20 as hardware modules.

The semiconductor device 200 is a so-called multimedia chip that decodes a plurality of types of multimedia data such as an AAC data, MPEG data, and JPEG data.

Figure 11:
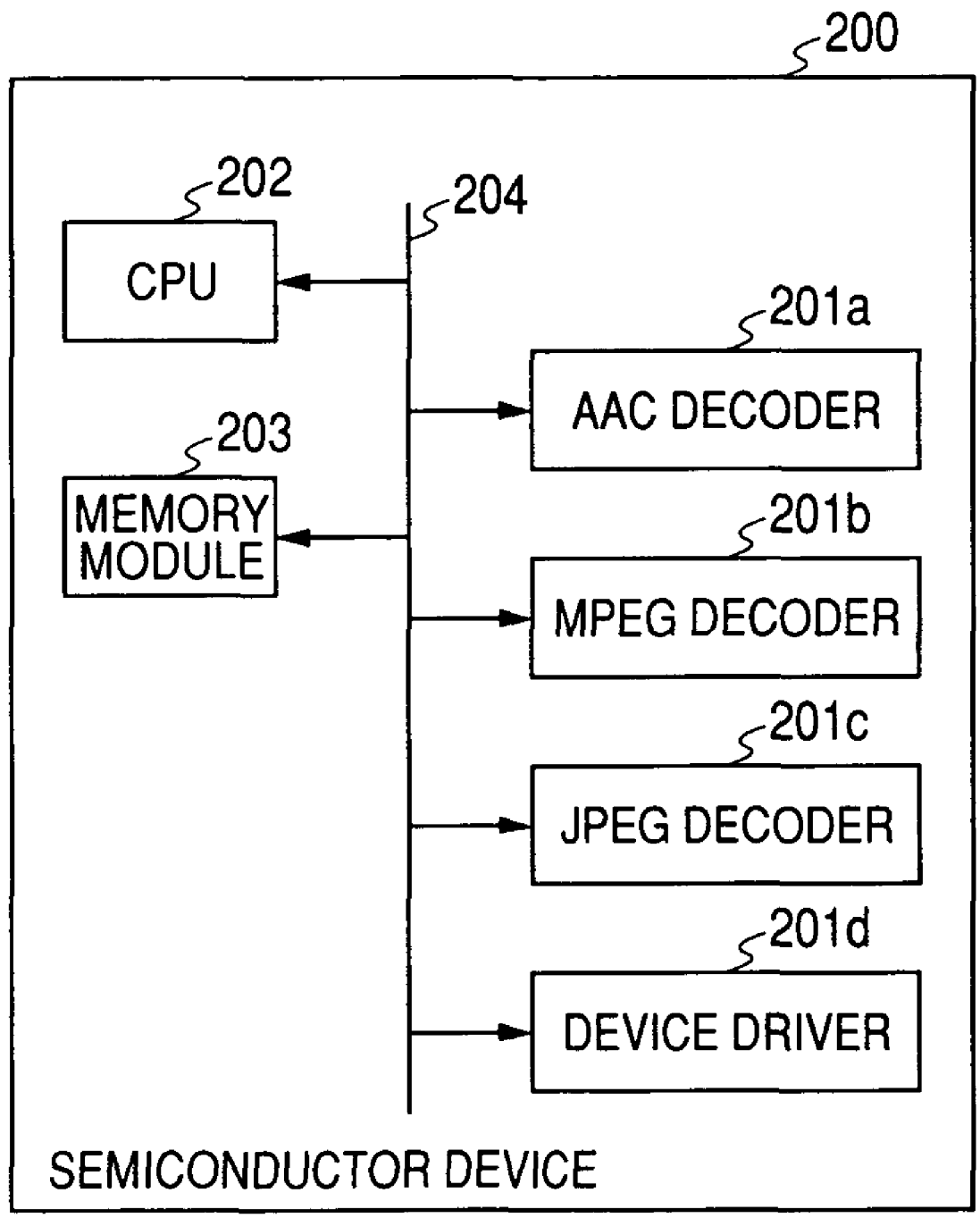
FIG. 11 is schematic block diagram of a semiconductor device according to a sixth embodiment.

As shown in FIG. 11, the semiconductor device 200 includes: a plurality of data processing modules 201a, 201b, 201c, and 201d (which will be collectively referred to as a data processing module 201 in below); a CPU (controller) 202 that controls the data processing modules 201; a memory module 203 that provides a work area for the data processing modules 201 and the CPU 202; and a bus 204 that allows the CPU 202 to access to the data processing modules 201 and the memory module 203.

Each of the data processing modules 201 are implemented as a hardware module that performs data processing, and respectively decodes one type of multimedia data such as AAC data (with AAC decoder 201a), MPEG data (with MPEG decoder 201b), JPEG data (with JPEG decoder 201c).

The data processing modules 201a-201c are configured as such described with reference to FIGS. 1-3 and 5, and perform data processing including data conversion for converting the input data into the output data.

The data processing module 201d (device driver 201d) is configured as such described with reference to FIG. 4, and performs control processing that includes no data conversion. The device driver 201d is provided for controlling an external output device, such as a speaker system or a display unit.

In the embodiment, the Open/Close interface 7 serves as a third interface that initializes an environment and a state for the data processing performed by the core module, and releases the environment.

The Open/Close interface 7 (third interface) provided in each of the data processing module 201 connects the core module 3 with the CPU (controller) 202, and terminates the data processing performed by the core module 3, in accordance with a request made by the CPU 3.

The Open/Close interface 7 allocates an address space in the memory module 203 and sets the parameter data to a default value, in accordance with a request made by the CPU 202. The Open/Close interface 7 releases the allocated address space, in accordance with a request made by the CPU 202.

In the embodiment, the data processing modules 201 may be provided with an independent memory device for allocating the address space, instead of allocating the address space in the memory module 203.

As described with reference to the embodiments, a wide variety of modules such as a codec can be modularized as a data converter simply provided with input and output, the function can easily be modified or extended while minimizing influence to the surrounding environment, the connection and the recombination in code level are possible with ease, and the connection procedure can also be unified and simplified.

The foregoing description of the embodiments has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A semiconductor device comprising:
a plurality of data processing modules;
a controller that controls the data processing modules;
a memory module that provides a work area for the data processing modules and the controller; and
a bus that allows the controller to access to the data processing modules and the memory module,
wherein each of the data processing modules comprises:
a core module that performs data processing on input data and generates output data;
a translate data interface that receives the input data and outputs the output data;
a property interface that receives parameter data to be used in the data processing performed by the core module, and outputs information regarding the core module;
an open/close interface that initializes an environment and a state for the data processing performed by the core module, and releases the environment; and
a query interface that notifies static entries of the translate data interface, the property interface, and the open/close interface, to the controller for enabling the controller to access the translate data interface, the property interface, and the open/close interface, in a common procedure with respect to other ones of the data processing modules,
wherein the property interface receives the parameter data defined by a character string or a numerical string, and
wherein the core module is configured to represent a functionality selected from various types of processing functionality in accordance with the parameter data received by the property interface.

2. The semiconductor device according to claim 1, wherein the open/close interface connects the core module with the controller, and terminates the data processing performed by the core module, in accordance with a request made by the controller.

3. The semiconductor device according to claim 1, wherein the open/close interface allocates an address space in a memory device and sets the parameter data to a default value, in accordance with a request made by the controller.

4. The semiconductor device according to claim 3, wherein the open/close interface allocates the address space in the memory module as the memory device.

5. The semiconductor device according to claim 3, wherein the open/close interface releases the allocated address space, in accordance with a request made by the controller.

6. The semiconductor device according to claim 1, wherein the core module performs a control processing that includes no data conversion.

7. The semiconductor device according to claim 1, wherein the core module performs a data conversion for converting the input data into the output data.

8. The semiconductor device according to claim 1, wherein the core module performs the data conversion for converting one set of the input data into a plurality of sets of the output data.

9. The semiconductor device according to claim 7, wherein the core module performs the data conversion for converting a plurality of sets of the input data into one set of the output data.

10. The semiconductor device according to claim 1, wherein each of the data processing modules further comprises a fourth interface that performs active action for performing requisition control directed to the controller.

11. A system for performing data processing, comprising:
a plurality of data processing modules;
a software framework that communicates with the data processing modules; and
a processing unit that performs procedures in accordance with the software framework and the data processing modules,
wherein each of the data processing modules comprises:
a core module for performing the data processing on input data and generating output data;
a translate data interface for receiving the input data and outputting the output data;
a property interface for receiving and outputting parameter data to be used in the data processing performed with the core module, and outputting information regarding the core module;
a an open/close interface for initializing an environment and a state for the data processing performed with the core module, and releasing the environment; and
a query interface for notifying static entries of the translate data interface, the property interface, and the open/close interface, to the software framework for enabling the software framework to access the translate data interface, the second property interface, and the open/close interface, in a common procedure with respect to other ones of the data processing modules,
wherein the property interface receives the parameter data defined by a character string or a numerical string, and wherein the core module is configured to represent a functionality selected from various types of processing functionality in accordance with the parameter data received by the property interface.

12. The system according to claim 11, further comprising a memory device that provides a work area for the software framework and the data processing modules, wherein the open/close interface allocates an address space in the memory device and sets the parameter data to a default value, in accordance with a request made by the software framework or by one of the data processing modules.

13. The system according to claim 12, wherein the open/close interface releases the allocated address space, in accordance with a request made by the software framework or by one of the data processing modules.

14. The system according to claim 11, wherein the core module performs a control processing that includes no data conversion.

15. The system according to claim 11, wherein the core module performs a data conversion for converting the input data into the output data.

16. The system according to claim 15, wherein the core module performs the data conversion for converting one set of the input data into a plurality of sets of the output data.

17. The system according to claim 15, wherein the core module performs the data conversion for converting a plurality of sets of the input data into one set of the output data.

18. The system according to claim 11, wherein each of the data processing modules further comprises a fourth interface that performs active action for performing requisition control directed to the software framework or to one of the data processing modules.

19. A semiconductor device according to claim 1, wherein each of the data processing modules each comprises an API interface through which the query interface dynamically accesses the translate data, property, and open/close interfaces.

* * * * *